(12) United States Patent
Jones et al.

(10) Patent No.: US 8,676,211 B2
(45) Date of Patent: Mar. 18, 2014

(54) SYSTEMS AND METHODS FOR SELECTIVE COMMUNICATIONS NETWORK ACCESS

(75) Inventors: D. Mark Jones, Ottawa (CA); Russ Freen, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 295 days.

(21) Appl. No.: 13/022,333

(22) Filed: Feb. 7, 2011

(65) Prior Publication Data

US 2012/0034922 A1      Feb. 9, 2012

Related U.S. Application Data

(60) Provisional application No. 61/302,664, filed on Feb. 9, 2010.

(51) Int. Cl.
*H04W 36/00* (2009.01)

(52) U.S. Cl.
USPC .......... 455/440; 455/438; 455/444; 455/41.2; 455/436; 370/331; 370/338

(58) Field of Classification Search
USPC .......... 455/436–444, 450–453, 41.2, 455/456.1–457; 370/331, 338
See application file for complete search history.

(56) References Cited

U.S. PATENT DOCUMENTS

| 6,553,232 | B1 * | 4/2003 | Shaffer et al. | 455/440 |
| 7,444,149 | B2 * | 10/2008 | Prehofer | 455/436 |
| 8,135,414 | B2 * | 3/2012 | Khokhar | 455/456.1 |
| 2009/0156210 | A1 * | 6/2009 | Ponce De Leon et al. | 455/436 |
| 2010/0296487 | A1 * | 11/2010 | Karaoguz et al. | 370/332 |
| 2012/0236826 | A1 * | 9/2012 | Roy et al. | 370/331 |

* cited by examiner

*Primary Examiner* — Marcos Torres
(74) *Attorney, Agent, or Firm* — Zilka-Kotab, PC

(57) ABSTRACT

Systems and methods for network congestion management thru selective network access among wireless cells and wireless hotspots are provided. In an embodiment of the present invention, a method to transmit a connection policy decision to a wireless communications device that is connected to a cellular wireless network whether to access a wireless hotspot is provided. The method includes determining a wireless cell location of the wireless communications device, generating a connection policy decision to determine whether the wireless communication device should access a wireless hotspot based on the wireless cell location and wireless hotspot availability, and transmitting the connection policy decision to the wireless communications device. In additional embodiments, the connection policy decision is based on one or more of battery charge levels of the wireless communications device, a mobility pattern of the wireless communications device, and historical success rates accessing the wireless hotspot within the wireless cell location.

16 Claims, 4 Drawing Sheets

SYSTEMS AND METHODS FOR SELECTIVE COMMUNICATIONS NETWORK ACCESS

This application claims the benefit of U.S. Provisional Application No. 61/302,664, filed Feb. 9, 2010, which is incorporated herein in its entirety.

FIELD OF THE INVENTION

The present invention relates generally to communications networks, more particularly, to network congestion management thru selective network access among wireless cells and wireless hotspots.

BACKGROUND

Portable computing devices such as laptop computers, personal data assistants (PDAs), smart phones and the like are in common usage, many featuring data communications support, powerful processors, larger and more colorful displays, and wireless networking and internet browsing capabilities. These advances in mobile technology have resulted in a dramatic increase in the volume of data communicated on wireless networks. These advances, coupled with subscribers seeking expanded mobility, drive subscribers to install and run data-hungry applications on their mobile devices. Data traffic is growing due to a combination of increasing market share of data-centric portable devices such as iPhone® and Blackberry® devices, lower wireless data subscription costs, higher wireless data throughput, and easier mobile access to data-intensive applications and rich content, such as, video. These trends are driving ever-increasing demands for wireless data communications.

Mobile data networks, such as fourth generation (4G) networks, and in particular third generation (3G) networks, use relatively scarce spectrum resources and are often overloaded with data at certain times of the day. 3G network operators have deployed WiFi hotspots in cells in which capacity overload is common. Unfortunately, the data offload rate from wireless cells to wireless hotspots has been limited. A primary reason why offload rates have been low is because smartphone users do not leave their WiFi radios on because this drains the battery level within the smartphone. Current 3G network technologies do not allow a network operator to force a device to switch to WiFi. However, even if a network operator could force a device to switch to a wireless hotspot, the device is the best decision maker to assess whether a handoff is appropriate. However, limiting the device's ability to identify WiFi hotspots is that typical devices do not have accurate geo-location. Accurate geo-location can be obtained by enabling a GPS receiver. However, enabling a GPS receiver also consumes valuable battery power. And it may not be economical for all classes of mobile phones to have GPS capabilities.

What is therefore needed are systems and methods for network congestion management thru selective network access among wireless cells and wireless hotspots that minimizes battery usage of a wireless communications device.

SUMMARY OF THE INVENTION

Embodiments of the present invention provide systems and methods for network congestion management thru selective network access among wireless cells and wireless hotspots. In an embodiment of the present invention, a method to transmit a connection policy decision to a wireless communications device that is connected to a cellular wireless network whether to access a wireless hotspot is provided. The method includes determining a wireless cell location of the wireless communications device, generating a connection policy decision to determine whether the wireless communication device should access a wireless hotspot based on the wireless cell location and wireless hotspot availability, and transmitting the connection policy decision to the wireless communications device.

In additional embodiments, the connection policy decision is based on one or more of battery charge levels of the wireless communications device, a mobility pattern of the wireless communications device, a data usage pattern of the wireless communications device, historical success rates accessing the wireless hotspot within the wireless cell location, historical success rates accessing the wireless hotspot within the wireless cell as a function of time of day and day of week, a capacity utilization of the wireless cell location, and on a type of subscriber plan for a user of the wireless communications device.

Further embodiments, features, and advantages of the invention, as well as the structure and operation of the various embodiments of the invention are described in detail below with reference to accompanying present drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
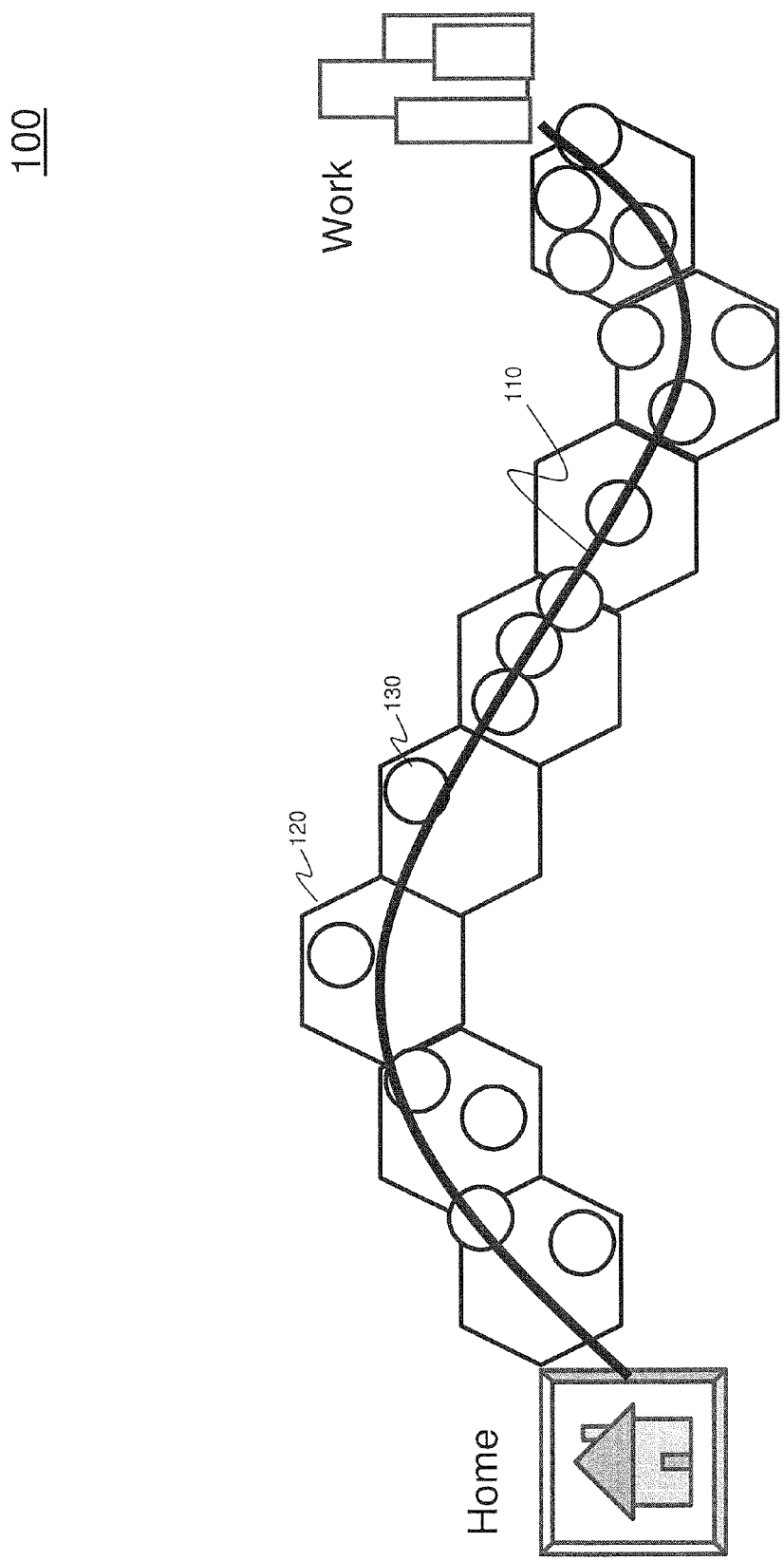
FIG. 1 depicts an exemplary mobility pattern for a user of a wireless communications device.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

This detailed description primarily refers to WiFi hotspots for ease of illustration. Wireless hotspots can include but are not limited to both WiFi and WIMAX hotspots. Additionally, wireless communications devices include, but are not limited to laptop computers, smartphones, cellular phones, and personal digital assistants.

Over a typical day, most subscribers will traverse the same wireless cells within a wireless cellular network, spending roughly the same time in each cell. For example, a typical subscriber will follow the same commute from home on workdays, as illustrated in FIG. 1. FIG. 1 provides an exemplary diagram illustrating a subscriber's mobility pattern 110 from home to work. The user typically will travel through a series of wireless cells, such as wireless cell 120, and will typically spend approximately the same amount of time in each cell. Within the series of wireless cells, a network operator may have established a set of wireless hotspots, such as wireless hotspot 130. The wireless hotspots may be deployed by the network operator, or be deployed by other network operators with which the network operator has established roaming partnerships.

In an embodiment of the invention, a network operator makes use of the mobility pattern, and other characteristics of the user and network to provide selective network access among wireless cells and wireless hotspots for a wireless communications device. In embodiments of the invention, a policy driven radio manager resides within the wireless communications device, and a connection policy manager resides within the network to provide selective network access among wireless cells and hotspots.

The policy-driven radio manager runs on a wireless communications device. The radio manager periodically reports cells visited, time spent in each cell and WiFi association success/failure rates for each cell to a connection policy manager. The radio manager also receives connection policy decisions from the connection policy controller, and evaluates the connection policy decision whenever the wireless communications device enters a new cell, for example.

In an embodiment, the connection policy considers the WiFi coverage in a cell to make a decision whether to request the wireless communications device to switch from accessing thru a wireless cell to a wireless hotspot. For example, if cell id=[x] and WiFi coverage >y %, then enable WiFi radio within the wireless communications device. In additional embodiments, more complex policies consider time of day/ day of week, data usage (overload) level of the cell as determined by a network operator, past success/failure rates of WiFi associations by the wireless communications device in a particular cell and device battery charge levels. In an embodiment, the policy action specifies the WiFi connection profile (e.g., SSID, etc.) to be used in the cell.

A connection policy manager runs as a service in a network operator's core network and is reachable from both the cellular and WiFi data networks. On reception of a cell usage report from a wireless communications device, the connection policy manager generates a new subscriber specific connection policy decision. In embodiments of the invention, the connection policy takes into account factors such as, subscriber service package and preferences, cell data overload periods, WiFi coverage in a given cell, a subscriber's data usage pattern and a subscriber's mobility patterns. The connection policy manager returns connection policy rules (e.g., whether to access a WiFi hotspot as a user traverses a particular wireless cell) for each visited cell and optionally for adjacent cells. The connection policy manager optionally includes a time-to-live value in the returned connection policy. When the time-to-live value expires, the wireless communications device requests a new connection policy decision.

Figure 2:
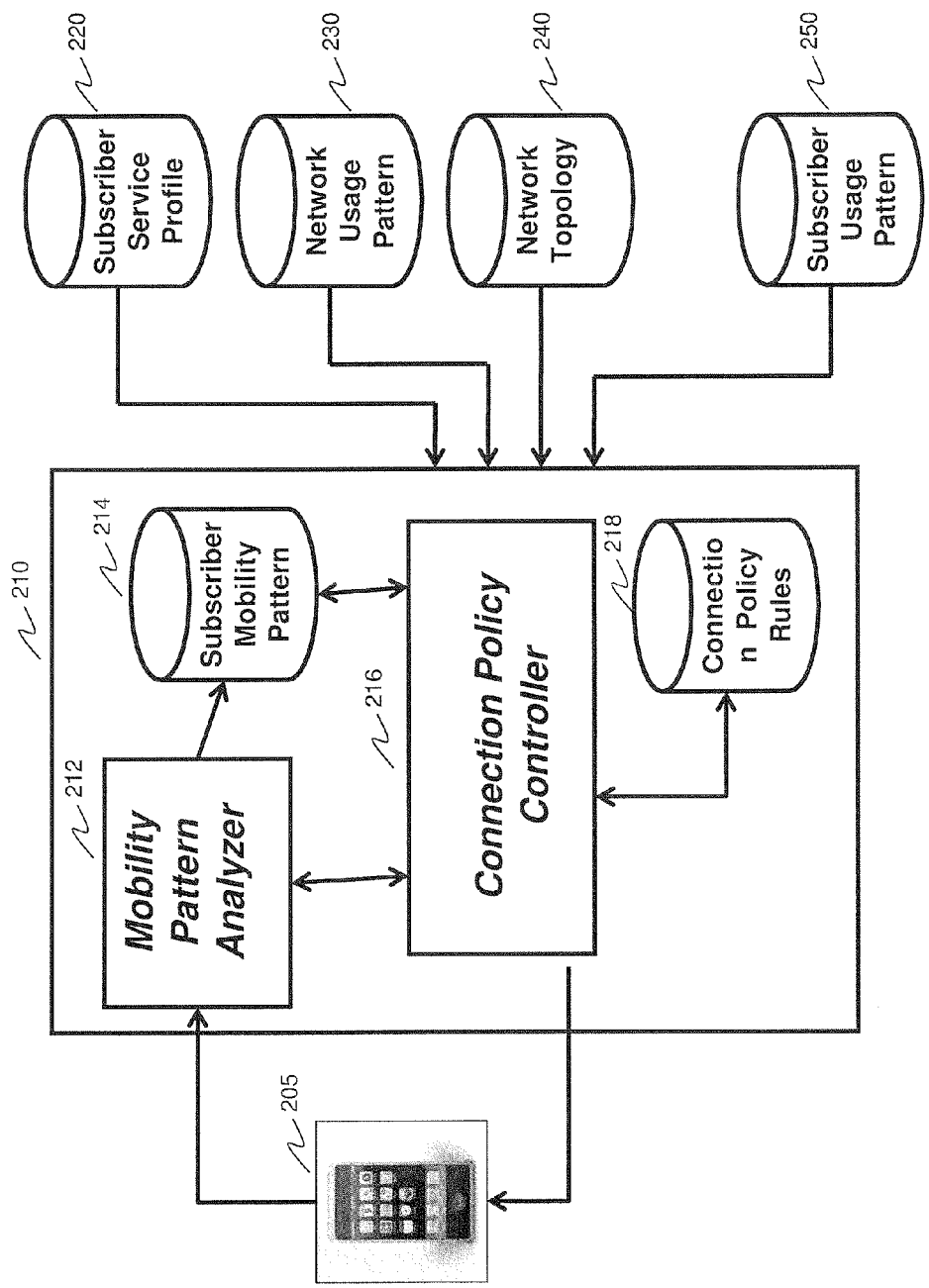
FIG. 2 depicts an exemplary network architecture for managing communications network congestion thru selective access of wireless cells and wireless hotspots, according to an embodiment of the invention.

FIG. 2 depicts an exemplary network architecture 200, according to embodiments of the invention. Smartphone 205 is communicatively coupled to connection policy manager 210 that resides within a wireless network. Connection policy manager 210 includes mobility pattern analyzer 212, subscriber mobility pattern database 214, connection policy controller 216 and connection policies database 218. Connection policy manager 210 also includes interfaces to subscriber service profile database 220, network usage pattern database 230, network topology database 240 and subscriber usage pattern database 250.

Subscriber service profile database 220 includes subscriber identifiers, rating plans and data limits associated with each subscriber identifier. Subscriber service profile database 220 may optionally include other data related to service profiles and preferences of a subscriber.

Network usage pattern database 230 includes cell identifiers and both historical and current percentage capacity utilization associated with each cell identifier for a cell within a specified time window.

Network topology database 240 includes cell identifiers and percentage WiFi coverage and preferred SSIDs associated with each cell.

Subscriber usage pattern database 250 includes subscriber identifiers, and usage pattern information associated with each subscriber identifier. For example, Subscriber usage pattern database 250 includes average megabytes of data usage per weekday and per weekend day on a per subscriber basis.

Subscriber mobility pattern database 214 includes on a per subscriber basis cell identifiers of cells typically used by a subscriber, the time windows that a subscriber is typically in a particular cell and the percentage of WiFi access success per cell. In embodiments, the subscriber mobility pattern database includes a set of mobility pattern profiles for each subscriber. A mobility pattern profile is generated for those mobility patterns whose occurrence exceeds a threshold, such as the subscriber traverses the mobility pattern more than twice per week.

Mobility pattern analyzer 212 receives mobility profile records for wireless communications devices. A set of mobility profile records is generated by a radio manager within a wireless communication device and transmitted to connection policy manager at a pre-configured time interval, when the wireless communications device enters a new cell, and/or when a time-to-live measure expires for a current connection policy. In an embodiment, the mobility profile record includes the type of network (e.g., 3G/WiFi), the attach point identifier (Cell ID or SSID), the start time, duration and result.

A radio manager within the wireless communications device uploads mobility profile records that were generated since the last upload. The radio manager within the wireless communications device requests a new connection policy from connection policy manager 210 when a time-to-live measure expires on a current connection policy and/or polls for a new policy after each upload. The radio manager evaluates the connection policy whenever it connects to a new cell. In an embodiment, to handle flip-flopping between cells, the radio manager remembers the last time a connection policy was executed for a particular cell and does not need to re-request a connection policy for that cell or to reevaluate a connection policy.

Upon receipt of a set of mobility profile records, mobility pattern analyzer 212 stores the mobility information in subscriber mobility pattern database 214 for the particular subscriber, and transmits the mobility profile record to connection policy controller 216.

Connection policy controller 216 generates a new connection policy decision for each wireless communications device upon receipt of a new set of mobility profile records or at other time intervals. An example connection policy is:

IF (cell id=x) AND
(8 am<[time]<9 am) AND (Mon<[DayOfWeek]<Fri)
([battery-level]>80%
THEN Enable WiFi radio AND attached to SSID name "TELCO-WIFI"

In general a connection policy decision is generated based on global data and subscriber-specific data. In embodiments, the global data on a per cell basis includes percentage WiFi coverage and SSID lists, and cellular network data usage levels, such as Mon-Fri: Start Time-End Time, % of capacity usage. In embodiments, the subscriber-specific data includes on a per subscriber basis data plan/service package, data usage pattern, mobility pattern, cell/WiFi success/failure patterns. Further, for efficiency reasons, in embodiments the connection policy controller 216 may be configured for providing a set of connection policies to a wireless communications device, enabling the wireless communications device to choose amongst them based on dynamic conditions such as SSID names.

An example subscriber specific connection policy includes an ordered list of rules, such as listing a series of cell ids, time windows and SSID lists for each cell ID for a given time window. Alternatively, the ordered SSID list is replaced by a WiFi On/Off directive and the SSID list from the existing WiFi connection manager or radio manager within a wireless communications device is used instead.

In embodiments, depending on the memory and computing power of the wireless communications device, some policy conditions can be evaluated by a radio manager within the wireless communications device. In embodiments, the mobility pattern analyzer function can run on the wireless communications device and report the subscriber mobility pattern rather than reporting raw mobility profile records. Similarly, in embodiments the wireless communications device can store its own success rates for WiFi attachment in each cell and use it to adapt the policy decision returned by connection policy controller 216.

Figure 3:
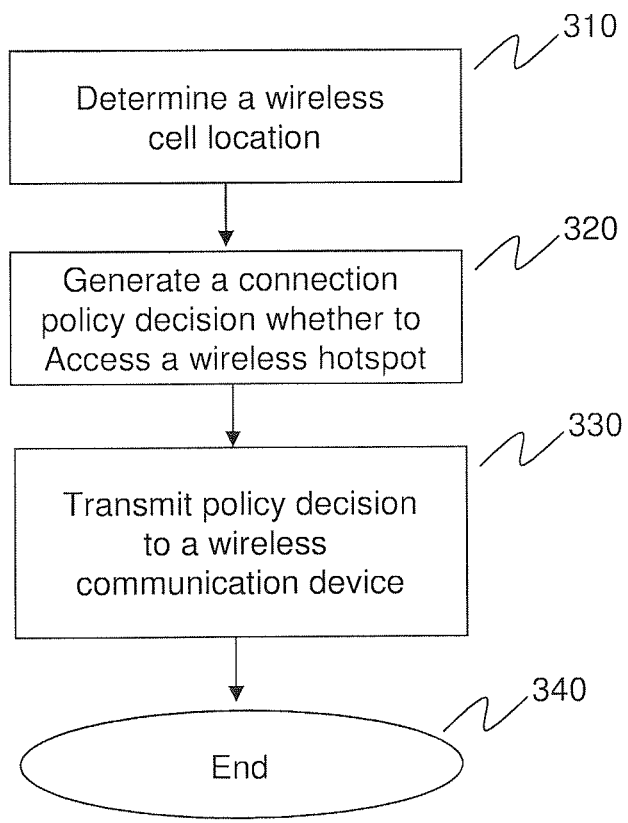
FIG. 3 provides an exemplary method for transmitting a connection policy decision to a wireless communications device as to whether a wireless hotspot should be accessed, according to an embodiment of the invention.

FIG. 3 provides an exemplary method 300 to instruct a wireless communications device that is connected to a cellular wireless network to access a wireless hotspot. Method 300 begins in step 310. In step 310 a determination is made as to the wireless cell location of a wireless communications device. For example, wireless communications device 205 sends a mobility profile record to connection policy manager 210. In an embodiment, the mobility profile record includes wireless cell locations visited, time spent in each cell, wireless association success rates and battery charge levels.

In step 320 a connection policy decision is generated to determine whether the wireless communication device should access a wireless hotspot based on the wireless cell location and wireless hotspot availability. For example, connection policy controller 216 generates a connection policy decision. In an embodiment, the connection policy decision is based on wireless cell location and wireless hotspot availability.

In additional embodiments, the connection policy decision is based on one or more of battery charge levels of the wireless communications device, a mobility pattern of the wireless communications device, a data usage pattern of the wireless communications device, historical success rates accessing the wireless hotspot within the wireless cell location, historical success rates accessing the wireless hotspot within the wireless cell as a function of time of day and day of week, a capacity utilization of the wireless cell location, and on a type of subscriber plan for a user of the wireless communications device.

Generating a connection policy decision whether the wireless communication device should access a wireless hotspot occurs when the wireless communications device enters the new wireless cell location.

Alternatively, generating a connection policy decision whether the wireless communication device should access a wireless hotspot occurs when a time to live measure expires for the wireless communications device.

In step 330 the connection policy decision is transmitted to the wireless communications device. In an embodiment, the policy decision transmitted includes transmitting the wireless hotspot connection profile to be used.

In an embodiment, method 300 further includes the step of generating a set of mobility pattern profiles for the wireless communications device, such that mobility pattern profile is generated for those mobility patterns whose occurrence is greater than a threshold. When a set of mobility pattern profiles are generated, a mobility pattern profile is selected from the set of mobility pattern profiles based on recent wireless cell locations visited, such that generating a connection policy decision to determine whether the wireless communication device should switch to a wireless hotspot is further based on the selected mobility pattern profile.

Method 300 optionally includes generating a time to live measure, such that upon expiry of the time to live measure the wireless communications device is required to provide a mobility profile record. In step 340, method 300 ends.

Figure 4:
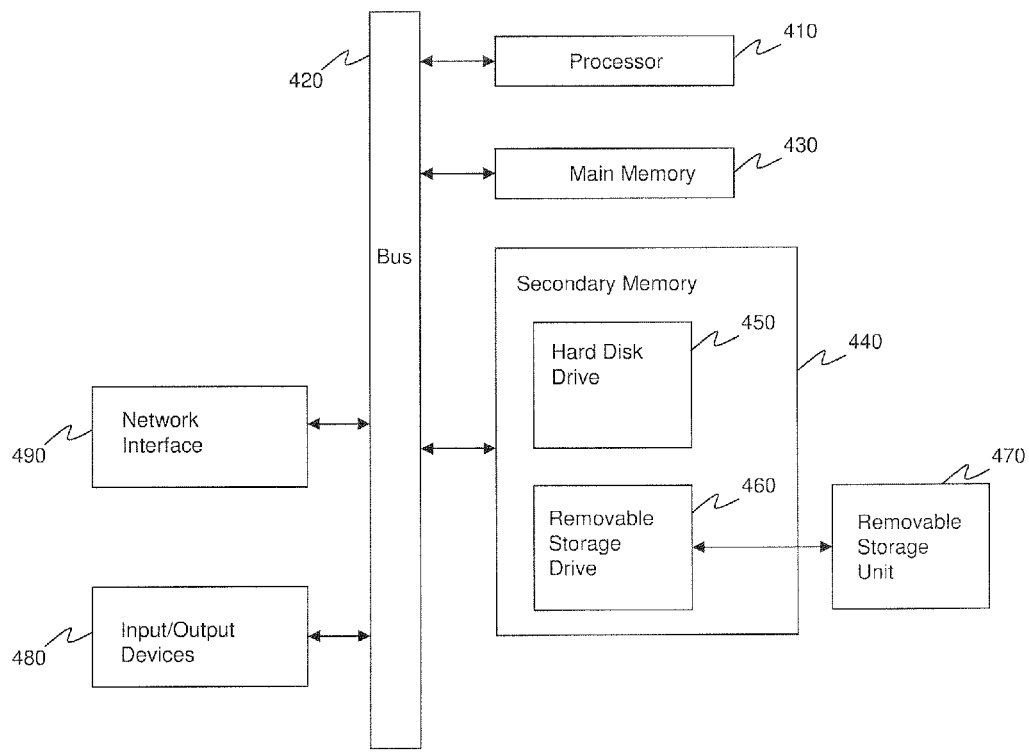
FIG. 4 depicts an exemplary computer system on which methods and systems herein may be implemented, according to embodiments of the present invention.

In an embodiment of the present invention, the methods and systems of the present invention described herein are implemented using well-known computers, such as a computer 400 shown in FIG. 4. The computer 400 can be any commercially available and well-known computer capable of performing the functions described herein, such as computers available from International Business Machines, Apple, Sun, HP, Dell, etc.

Computer 400 includes one or more processors (also called central processing units, or CPUs), such as processor 410. Processor 410 is connected to communication bus 420. Computer 400 also includes a main or primary memory 430, preferably random access memory (RAM). Primary memory 430 has stored therein control logic (computer software), and data.

Computer 400 may also include one or more secondary storage devices 440. Secondary storage devices 440 include, for example, hard disk drive 450 and/or removable storage device or drive 460. Removable storage drive 460 represents a floppy disk drive, a magnetic tape drive, a compact disk drive, an optical storage device, tape backup, ZIP drive, JAZZ drive, etc.

Removable storage drive 460 interacts with removable storage unit 470. As will be appreciated, removable storage drive 460 includes a computer usable or readable storage medium having stored therein computer software (control logic) and/or data. Removable storage drive 460 reads from and/or writes to the removable storage unit 470 in a well-known manner.

Removable storage unit 470, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 400, or multiple computer 400s to perform any combination of the functions described herein Computer programs (also called computer control logic) are stored in main memory 430 and/or the secondary storage devices 440. Such computer programs, when executed, direct computer 400 to perform the functions of the present invention as discussed herein. In particular, the computer programs, when executed, enable processor 410 to perform the functions of the present invention. Accordingly, such computer programs represent controllers of the computer 400.

Computer 400 also includes input/output/display devices 480, such as monitors, keyboards, pointing devices, etc.

Computer 400 further includes a communication or network interface 490. Network interface 490 enables computer 400 to communicate with remote devices. For example, network interface 490 allows computer 400 to communicate over communication networks, such as LANs, WANs, the Internet, etc. Network interface 490 may interface with remote sites or networks via wired or wireless connections. Computer 400 receives data and/or computer programs via network interface 490. The electrical/magnetic signals having contained therein data and/or computer programs received or transmitted by the computer 400 via network interface 490 also represent computer program product(s).

The invention can work with software, hardware, and operating system implementations other than those described herein. Any software, hardware, and operating system implementations suitable for performing the functions described herein can be used.

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method, comprising:
    developing a set of mobility pattern profiles for a wireless communications device, where each mobility pattern profile includes an indication of a plurality of wireless cells that are traversed by the wireless communications device and a window of time in which the wireless communications device traversed each cell, and where a mobility pattern profile is generated for a mobility pattern having an occurrence greater than a threshold, such that the mobility pattern profile is generated for mobility pattern that occurs more than a predetermined number of times during a predetermined time period;
    determining a wireless cell location of the wireless communications device;
    selecting a mobility pattern profile from the set of mobility pattern profiles based on wireless cell locations visited within a predetermined time period;
    generating a connection policy decision by determining whether the wireless communication device should access a wireless hotspot based on the wireless cell location, the selected mobility pattern profile, and an availability of a wireless hotspot; and
    transmitting the connection policy decision to the wireless communications device.

2. The method of claim 1, wherein the connection policy decision is further based on battery charge levels of the wireless communications device.

3. The method of claim 1, wherein the connection policy decision is further based on a data usage pattern of the wireless communications device.

4. The method of claim 1, wherein the connection policy decision is further based on historical success rates accessing the wireless hotspot within the wireless cell location.

5. The method of claim 1, wherein the connection policy decision is further based on historical success rates accessing the wireless hotspot within the wireless cell as a function of time of day and day of week.

6. The method of claim 1, wherein the connection policy decision is further based on a capacity utilization of the wireless cell location.

7. The method of claim 1, wherein the connection policy decision is further based on a type of subscriber plan for a user of the wireless communications device.

8. The method of claim 1, wherein generating the connection policy decision occurs when the wireless communications device enters the wireless cell location.

9. The method of claim 1, wherein generating a connection policy decision occurs when a time to live measure expires for the wireless communications device.

10. The method of claim 1, further comprising transmitting the wireless hotspot connection profile to be used.

11. The method of claim 1, further comprising receiving periodic updates from the wireless communications device that indicate one or more of wireless cell locations visited, time spent in each cell, wireless association success rates and battery charge levels.

12. The method of claim 1, further comprising generating a time to live measure, wherein upon expiry of the time to live measure the wireless communications device is required to provide a mobility profile record.

13. The method of claim 12, wherein the mobility profile record includes one or more of wireless association success rates and battery charge levels.

14. The method of claim 1, wherein the wireless hotspot comprises a WIFI hotspot or a WIMAX hotspot.

15. The method of claim 1, wherein the wireless communications device comprises a laptop computer, a smartphone, a cellular phone, or a personal digital assistant.

16. A connection policy manager within a wireless network, comprising:
    a processor for:
        developing a set of mobility pattern profiles for a wireless communications device, where each mobility pattern profile includes an indication of a plurality of wireless cells that are traversed by the wireless communications device and a window of time in which the wireless communications device traversed each cell, and where a mobility pattern profile is generated for a mobility pattern having an occurrence greater than a threshold, such that the mobility pattern profile is generated for a mobility pattern that occurs more than a predetermined number of times during a predetermined time period;
        determining a wireless cell location of the wireless communications device;
        selecting a mobility pattern profile from the set of mobility pattern profiles based on wireless cell locations visited within a predetermined time period;
        generating a connection policy decision by determining whether the wireless communication device should access a wireless hotspot based on the wireless cell location, the selected mobility pattern profile, and an availability of a wireless hotspot; and
        transmitting the connection policy decision to the wireless communications device.

* * * * *